(12) United States Patent
Henry et al.

(10) Patent No.: US 7,043,622 B2
(45) Date of Patent: May 9, 2006

(54) METHOD AND APPARATUS FOR HANDLING STORAGE REQUESTS

(75) Inventors: Russell J. Henry, Wichita, KS (US);
Bret S. Weber, Wichita, KS (US);
Dennis E. Gates, Wichita, KS (US);
John R. Kloeppner, Buhler, KS (US);
Keith W. Holt, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 359 days.

(21) Appl. No.: 10/329,184

(22) Filed: Dec. 23, 2002

(65) Prior Publication Data

US 2004/0123017 A1 Jun. 24, 2004

(51) Int. Cl.
*G06F 12/00* (2006.01)

(52) U.S. Cl. .................... 711/203; 711/202; 711/206

(58) Field of Classification Search .............. 711/3, 711/6, 202–203, 205–207
See application file for complete search history.

(56) References Cited

U.S. PATENT DOCUMENTS 5,430,855 A * 7/1995 Walsh et al. ............... 710/10
6,363,470 B1 * 3/2002 Laurenti et al. ........... 711/220
6,529,201 B1 * 3/2003 Ault et al. .................. 345/582
6,529,995 B1 * 3/2003 Shepherd ................... 711/114
6,647,387 B1 * 11/2003 McKean et al. ............ 707/9
6,684,209 B1 * 1/2004 Ito et al. .................... 707/9
6,718,404 B1 * 4/2004 Reuter et al. ............... 710/20
6,757,753 B1 * 6/2004 DeKoning et al. .......... 710/38
6,772,231 B1 * 8/2004 Reuter et al. ............... 710/8

* cited by examiner

*Primary Examiner*—Nasser Moazzami
(74) *Attorney, Agent, or Firm*—Duft Bornsen & Fishman LLP (57) ABSTRACT

Systems and methods for handling I/O requests from a host system to a storage system. A system includes an I/O module for processing I/O requests from a host system, a virtualized storage element, and a communication medium coupling the I/O module to the virtualized storage elements. The virtualized storage element includes a mapping table for translating virtual storage locations into physical storage locations and a plurality of physical storage locations. The virtualized storage element generates base virtual addresses using the mapping table to communicate the base virtual addresses to the I/O module. The I/O module generates specific virtual addresses using the base virtual addresses and using information derived from the I/O requests. The I/O module uses the specific virtual addresses in communication with the virtualized storage element to identify the physical storage locations in the virtualized storage element.

18 Claims, 7 Drawing Sheets

METHOD AND APPARATUS FOR HANDLING STORAGE REQUESTS

RELATED PATENTS

This patent application is related to co-pending, commonly owned U.S. patent application Ser. No. 02-5573, entitled METHODS AND STRUCTURE FOR READ PREFETCH IN A STORAGE COMPLEX ARCHITECTURE, filed the same day which is hereby incorporated by reference and is referred to herein as the "related patent."

BACKGROUND OF THE INVENTION

1. Field of the Invention

The present invention is generally directed toward handling requests of host systems to physical storage locations within a storage complex. More specifically, the present invention relates to transferring requests to a virtualized storage element using virtual addresses so that the host systems can access the physical storage locations.

2. Discussion of Related Art

Large storage systems typically include storage elements that comprise a single storage device or an array of storage devices. The individual storage devices are accessed by host systems via Input/Output (I/O) requests, such as reading and writing, through one or more storage controllers. A user accessing the disks through the host system views the multiple disks as a single disk. One example of a large storage system includes a Redundant Array Of Independent Disks (RAID) storage system that has one or more logical units (LUNs) distributed over a plurality of disks. Multiple LUNs are often grouped together in storage partitions. Each storage partition is typically private to a particular host system, thus, LUNs of a particular storage partition are also private to the particular host system. Examples of the host systems include computing environments ranging from individual personal computers and workstations to large networked enterprises encompassing numerous, heterogeneous types of computing systems. A variety of well-known operating systems may be employed in such computing environments depending upon the needs of particular users and enterprises. Disks in such large storage systems may include standard hard disk drives as often found in personal computers as well as other types of storage devices such as optical storage, semiconductor storage (e.g., Random Access Memory disks, or RAM disks), tape storage, et cetera.

Large storage systems have a finite capacity that may be scaled up or down by adding or removing disk drives as deemed necessary by the amount of needed storage space. However, since the capacity is finite, storage space of the storage system is limited to a maximum number of disks that can be employed by a particular storage system. Once the limit of disks is reached, storage space of the storage system can only be increased by replacement of the residing disks with disks that have more storage space, assuming the storage controller of the storage system allows higher capacity disks. Such a process is limited by disk technology advancements or by capabilities of the storage controller.

Many organizations demand larger storage capacity and cannot wait for these disk technology advancements or for changes to the storage controllers within the storage system. For example, organizations that continually grow in size and technology have an ever-changing need to document and maintain information. These organizations also demand that the increases to their storage capacity be rapidly and easily implemented such that the stored information is rapidly accessible and flexibly configured for access within the organization. An unmanageable storage network of independent storage systems may impede processing of stored information.

Former solutions attempted to address the problems associated with the increased storage capacity demands. One solution employed multiple storage systems to increase the storage capacity. The storage capacity problem was, thus, simply solved through the scaling of storage space by the number of storage systems. Many of these solutions required the storage systems to operate independently, thereby mandating that users access information of each storage system independently. Other solutions required the storage systems to transfer large, unwieldy maps between storage elements and host system interfaces. These maps were necessary to direct the I/O requests to appropriate storage blocks within a particular disk. These large map transfers substantially degraded the more important storage transfer capabilities by occupying valuable memory bandwidth as well as data transfer bandwidth. Additionally, as more storage capacity was employed, larger and more complex maps caused management of the information to become excessively cumbersome As evident from the above discussion, a need exists for improved structures and methods for managing storage transfer capabilities as the storage capacity is increased.

SUMMARY OF THE INVENTION

The present invention solves the above and other problems and advances the state of the useful arts by providing apparatus and methods for handling I/O requests from a host system to a storage system. More specifically, the invention provides a means for providing a host system with direct access to physical storage locations through a virtualized storage element.

In one exemplary preferred embodiment of the invention, the host systems provide for generating, maintaining and using merged partitions, such as those described in U.S. patent application Ser. No. 10/230,735 filed on 29 Aug. 2002, hereby incorporated by reference.

In one exemplary preferred embodiment of the invention, a host system sends a I/O request to the virtualized storage element to request access to physical storage space, such as a block of storage space within a storage volume. The virtualized storage element receives the request and generates a base virtual address. An I/O module uses the base virtual address and information from the I/O request to generate a specific virtual address. Once the specific virtual address is generated, the I/O module transfers the specific virtual address to the virtualized storage element. The virtualized storage element processes the specific virtual address to access a particular physical storage location. The type of access to the particular physical storage location depends on the type of I/O request (e.g., a read request or a write request).

In one aspect of the invention, a system includes an I/O module for processing I/O requests from a host system and a virtualized storage element including. The virtualized storage element includes a plurality of physical storage locations and a mapping table for translating virtual storage locations into the physical storage locations. The system also includes a communication medium coupling the I/O module to the virtualized storage elements. The virtualized storage element is operable to generate base virtual addresses using the mapping table to communicate the base virtual addresses to the I/O module. The I/O module is operable to generate specific virtual addresses using the base virtual addresses and using information derived from the I/O requests. The I/O module uses the specific virtual addresses in communication with the virtualized storage element to identify the physical storage locations in the virtualized storage element.

In another aspect of the invention, the communication medium includes a storage communication switching fabric for transferring the I/O requests between the host system and the physical storage locations using the specific virtual addresses.

In another aspect of the invention, the I/O module is operably configured within the host system.

In another aspect of the invention, the I/O module is operably configured within the virtualized storage element.

In another aspect of the invention, each of a portion of the base virtual addresses includes a proper subset of the mapping tables for indirect access to the physical storage locations.

In another aspect of the invention, the base virtual addresses include indicators to alert the I/O module to a type of addressing, wherein the addressing is direct or indirect.

In one aspect of the invention, a method provides for handling I/O requests from a host system to a storage system. The method includes steps of translating virtual storage locations into physical storage locations with a mapping table to generate base virtual addresses, generating specific virtual addresses from the base virtual addresses and from information derived from the I/O requests and processing the I/O requests from the host system using the specific virtual addresses to identify the physical storage locations.

In another aspect of the invention, the method includes a step of transferring the I/O requests between the host system and the physical storage locations using the specific virtual addresses.

In another aspect of the invention, the method includes a step of receiving the I/O requests from the host system.

In another aspect of the invention, the step of generating the specific virtual addresses includes a step of determining offsets of the base virtual addresses.

In another aspect of the invention, the method includes a step of transferring data from or to the physical storage locations depending on the information derived from I/O requests.

In another aspect of the invention, the step of processing includes a step of determining the physical storage locations by processing offsets of the specific virtual addresses.

In another aspect of the invention, the step of determining includes steps of dividing each of a portion of the offsets by a size of storage space to be accessed to locate a map address, wherein the step of dividing produces a quotient and a remainder and adding the remainder to the map address to determine a certain physical storage location.

Advantages of the invention include a reduction of memory bandwidth as large computationally intensive maps are no longer transferred from the storage element. Other advantages include improved request management and faster data transfers between storage elements and host systems.

BRIEF DESCRIPTION OF THE PREFERRED EMBODIMENTS

DETAILED DESCRIPTION OF THE PREFERRED EMBODIMENTS

While the invention is susceptible to various modifications and alternative forms, a specific embodiment thereof has been shown by way of example in the drawings and will herein be described in detail. Those skilled in the art will appreciate that the features described below can be combined in various ways to form multiple variations of the invention. As a result, the invention is not limited to the specific examples described below, but only by the claims and their equivalents.

Figure 1:
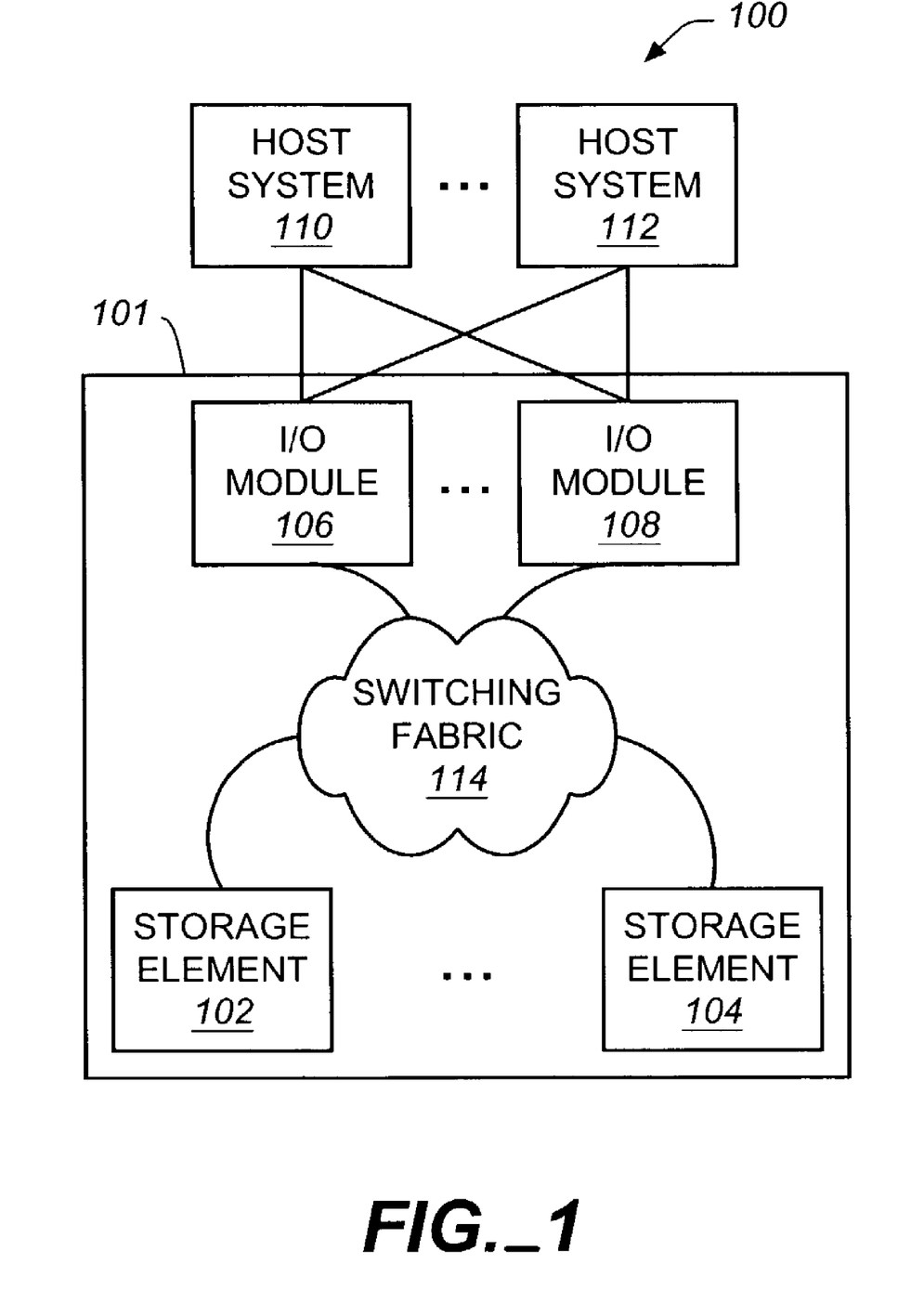
FIG. 1 is a block diagram illustrating an exemplary preferred embodiment of the invention.

With reference now to the figures and in particular with reference to FIG. 1, an exemplary preferred embodiment of the invention is shown in system 100. System 100 is configured for handling I/O requests from host systems, such as host systems 110 and 112, to storage system 101. Examples of the host systems include computing environments ranging from individual personal computers and workstations to large networked enterprises encompassing numerous, heterogeneous types of computing systems. The host systems may be communicatively connected to I/O modules, such as I/O modules 106 and 108, for processing the requests through a variety of connections. Examples of such connections include Fibre Channel (FC), Small Computer System Interface (SCSI), Internet SCSI (ISCSI), Ethernet, Infiniband, SCSI over Infiniband (e.g., SCSI Remote Direct Memory Access Protocol, or SRP), piping, and/or various physical connections. Infiniband is an architecture and specification for data flow between processors and I/O devices. Those skilled in the art understand infiniband and can retrieve information about infiniband from http://www.infinibandta.org/home. A variety of well-known operating systems may be employed in such computing environments depending upon the needs of particular users and enterprises.

Within storage system 101, I/O modules 106 and 108 process the I/O requests from the host systems to access physical storage space within storage elements 102 and 104. The requests are transferred from the I/O modules to the storage elements through a communication medium, such as switching fabric 114. Each of the storage elements may include one or more storage volumes such as standard hard disk drives (e.g., those often found in personal computers), and other types of storage devices (e.g., optical storage, tape storage, semiconductor storage). Each of storage elements 102 and 104 may include a storage controller, discussed in FIG. 2, for processing requests, such as read and write requests from host systems 110 and 112 directed to the storage elements by I/O modules 106 and 108. The number of host systems, storage elements, and I/O modules is not intended to be limited to the number of host systems, storage elements, and I/O modules in the embodiment. Additionally, in some embodiments, the I/O modules are housed within the host systems.

In system 100, the storage elements are virtualized and appear as a single storage system to the host systems. These virtualized storage elements include mapping tables for translating virtual storage locations into physical storage locations of the storage elements, and, thus, the individual storage volumes. A virtualized storage element is operable to generate base virtual addresses using the mapping tables. The base virtual addresses are simplified data structures for pointing to specific physical storage locations within the storage elements. The base virtual addresses may alleviate data transfer problems associated with transferring map structures from the storage elements to the I/O modules.

The virtualized storage elements communicate the base virtual addresses to the I/O modules. When an I/O module receives a base virtual address, the I/O module generates a specific virtual address using the received base virtual address and using information derived from a received I/O request. The I/O module uses the specific virtual addresses in communication with the virtualized storage element to identify the physical storage locations in the virtualized storage element. Virtual addresses are described in greater detail in FIG. 5.

Figure 2:
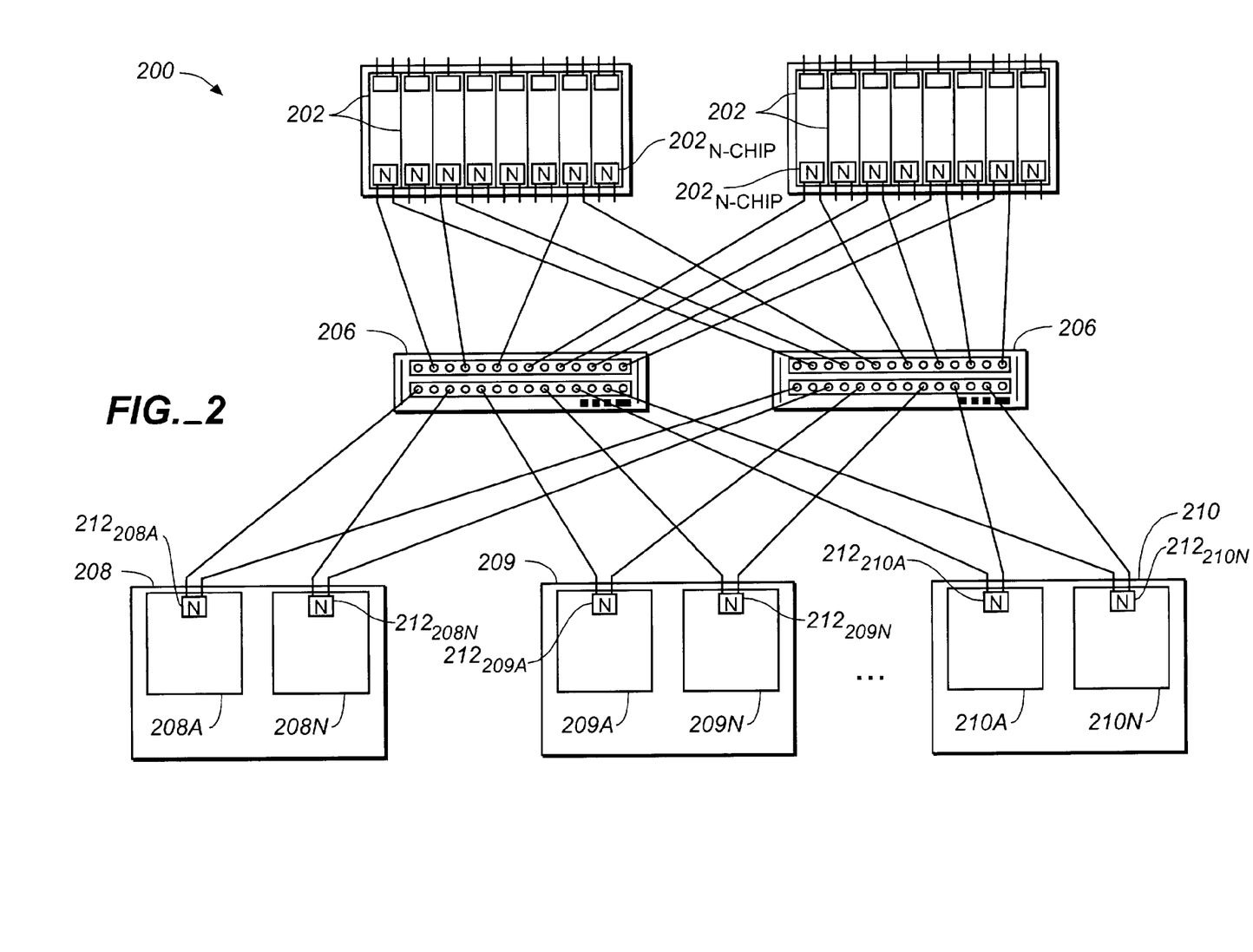
FIG. 2 is a block diagram illustrating an exemplary preferred embodiment of a storage system.

FIG. 2 illustrates additional detail of an exemplary preferred embodiment of a storage system 200. Storage system 200 includes a plurality of I/O modules 202, communication switches 206, and virtualized storage elements 208, 209 and 210. Each of the storage elements 208, 209 and 210 includes storage controllers, such as storage controllers 208A . . . 208N of virtualized storage element 208, storage controllers 208A . . . 208N of virtualized storage element 208, and storage controllers 210A . . . 210N of virtualized storage element 210. These storage elements and storage controllers can be configured to employ a storage management scheme such as that of a RAID storage management system. As such, the storage controllers may include RAID storage controllers for processing the requests of host systems, such as host systems 110 and 112 of FIG. 1, through I/O modules 202 and communication switches 206.

Figure 3:
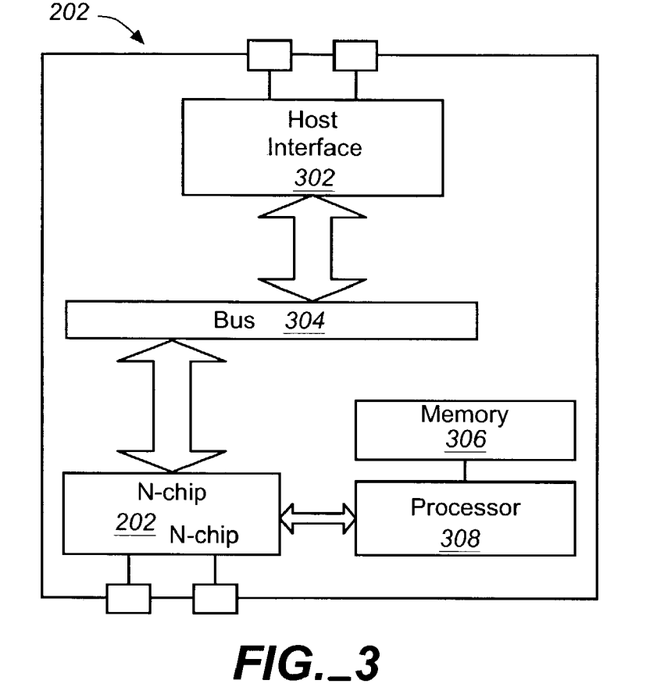
FIG. 3 is a block diagram illustrating an exemplary preferred embodiment of an I/O module.

The I/O modules 202, discussed in greater detail in FIG. 3, have host connect interfaces for receiving I/O requests from the host systems and transferring data between the host systems and the virtualized storage elements. The I/O modules 202 can connect to the host systems through a variety of means, such as those described in FIG. 1. Each I/O module is communicatively connected to a switching fabric comprising communications-switches 206 through an N-chip $202_{N\text{-}chip}$. The N-chips $202_{N\text{-}chip}$ are devices, such as Application Specific Integrated Circuits (ASIC), configured to route data from a host system through the switching fabric and to a virtualized storage element according to the specific virtual address. Those skilled in the art are familiar with communications switches and will readily recognize the design of such a custom ASIC for purposes of transferring messages through such a switched fabric or other communication medium.

The communications switches are communicatively connected to the virtualized storage elements 208, 209, and 210 through their associated storage controllers, 208A . . . 208N, 209A . . . 209N, and 210A . . . 210N, respectively. The storage controllers, like I/O modules 202, include storage controller N-chips 212, such as N-chip $212_{208A}$ of storage controller 208A. These storage controller N-chips are devices, such as ASICs, configured to retrieve and store data of the virtualized storage elements according to the specific virtual address from I/O modules 202. The storage controller N-chips 212 receive the specific virtual addresses from I/O modules 202 and extract actual physical address locations of data on physical storage volumes within a virtualized storage element. Once a physical location of the data of the storage element is determined, the storage controller can retrieve the data from the storage element to the host system or store data from the host system at the physical location of the storage element.

FIG. 3 illustrates an exemplary preferred embodiment of I/O module 202, such as that illustrated in FIG. 2. I/O module 202 includes host interface 302, bus 304, N-chip $202_{N\text{-}chip}$, processor 308, and memory 306. Host interface 302 is an interface capable of communicating to a host system, such as host system 110 of FIG. 1, through a variety of means, such as FC, SCSI, SCSI ISCSI, Ethernet, Infiniband, SCSI over Infiniband, piping, and/or various physical connections. Host interface 302 receives a I/O request from the host system to access a block of storage space within a storage element, such as virtualized storage element 208 of FIG. 2. Host interface 302 transfers that I/O request to N-chip $202_{N\text{-}chip}$ through bus 304. N-chip $202_{N\text{-}chip}$ then maintains information about the I/O request and transfers the request to the appropriate virtualized storage element.

In response to an I/O request, the virtualized storage element will transfer a base virtual address to N-chip $202_{N\text{-}chip}$. N-chip $202_{N\text{-}chip}$ will transfer the base virtual address to processor 308. Processor 308 stores the virtual base address in memory 306 until it can access the information about the I/O request from host interface 302. N-N-chip $202_{N\text{-}chip}$ retrieves the I/O request information from host interface 302 and forwards it to processor 308 through bus 304. N-chip $202_{N\text{-}chip}$ retrieves the base virtual address from memory via processor 306 and generates a specific virtual address from information contained in the base virtual address and from the information contained in the I/O request. N-chip $202_{N\text{-}chip}$, in turn, routes the specific virtual address to the appropriate virtualized storage element. Processors, buses, and computer memory, such as processor 308, bus 304, and memory 306, respectively, are known to those skilled the art.

Figure 4:
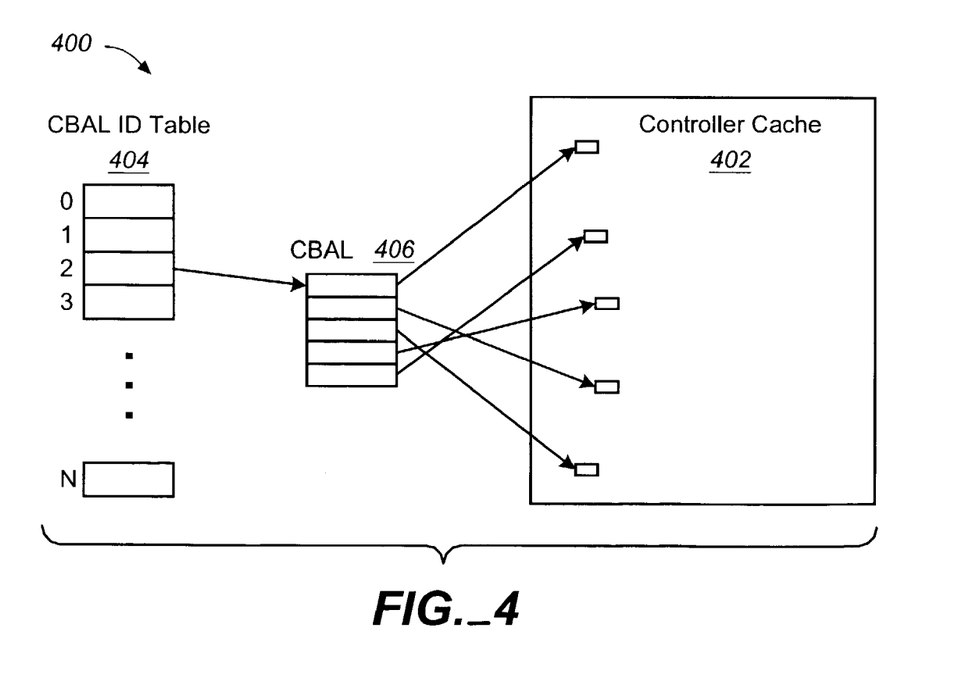
FIG. 4 is a block diagram illustrating an exemplary preferred embodiment of a virtualized storage element.

FIG. 4 is a block diagram illustrating an exemplary preferred embodiment of a virtualized storage element, such as virtualized storage element 208 of FIG. 2. The storage element is virtualized through storage controllers located within the storage element, such as storage controller $212_{208A}$ of virtualized storage element 208 in FIG. 2. A storage controller generates a base virtual address corresponding to a physical storage location of the storage element when a host system, such as host system 110 of FIG. 1, transfers an I/O request. The storage controller analyzes the I/O request and determines if the storage space of the I/O request is contiguous. For example, an I/O request may inquire about certain block of data stored within the storage elements. The data may be spread among non-contiguous physical address locations within the block. If the data is contiguous, the storage controller generates the base virtual address so that address indicates that data is contiguous. Otherwise, the storage controller generates the base virtual address so as to indicate that the data is not contiguous.

In one embodiment of the invention, the storage controller caches data in controller cache 402 when an I/O request is received. In some instances, the I/O request may require access to more data than controller cache 402 can cache. In these instances, storage controller may generate multiple base virtual addresses to account for the request data. For example, if an I/O request requires access to 512 kilobytes (kBytes) of data when controller cache can cache only 128 kBytes of data, the storage controller will generate four base virtual addresses for accessing four 128 kBytes blocks of data to fulfill the I/O request. This is embodiment is also explained in greater detail below in FIG. 8. This embodiment is intended to be exemplary as other embodiments that access data of different sizes may also fall within the scope of the invention.

After generating the base virtual address, the storage controller transfers the base virtual address to an I/O module, such as I/O module 202 of FIG. 2. The I/O module eventually responds with a specific virtual address as described in FIG. 2. The storage controller receives the specific virtual address via an N-chip, such as N-chip $212_{208A}$ of storage controller 208A of FIG. 2, and extracts the actual physical location of data within the storage element according to the data being accessed, i.e., according to whether the data is contiguous or not. If the data being accessed is contiguous, the storage controller will directly transfer the data between the physical storage location and the host system. However, if the data is not contiguous, the storage controller will indirectly transfer the data between the physical storage location and the host system through mapping structure 400.

Mapping structure 400 is used for indirect transfers and includes a mapping table shown as cache block address list identification (CBAL ID) table 404. Mapping structure 400 also includes a cache block identification list (CBAL) 406. CBAL ID table 404 points to virtual address locations of the data in CBAL 406. CBAL 406 maps to physical storage locations within the storage element through storage controller cache 402. The storage controller processes an incoming specific virtual address to determine the location of requested data using map structure 400. For example, an incoming specific virtual address has an identifier that correlates to a field in CBAL ID table 404. The correlated field of the CBAL ID table 404 includes an address of a block of storage space within a particular storage element. The storage controller processes the address of the block by dividing an offset field of the address by an offset field of the specific virtual address. The storage controller processes the result to point to CBAL 406 to determine a physical address of the block of data stored within the storage element. In this example, data is being transferred indirectly. As such, the data is not completely contiguous and the storage controller uses a remainder of the previously mentioned division process to determine a specific location within the block.

In this embodiment, the storage controllers and I/O modules virtualize the storage elements through the virtual addresses. The system is capable of both direct and indirect data transfers between the storage element and the host system. Mapping structure 400 when used for indirect data transfers decreases the amount of memory bandwidth that is used because mapping is performed by processing the specific virtual addresses. The specific virtual addresses of indirect data transfers contain a proper subset of the mapping structures. The storage controllers, therefore, do not need to transfer entire mapping structures to the I/O modules. The specific virtual address as used in a direct transfer does not require a proper subset of the mapping structures because the data being accessed is contiguous. As such, direct data transfers may use even less memory bandwidth than the indirect data transfers. Addressing is described in greater detail in FIG. 5.

Figure 5:
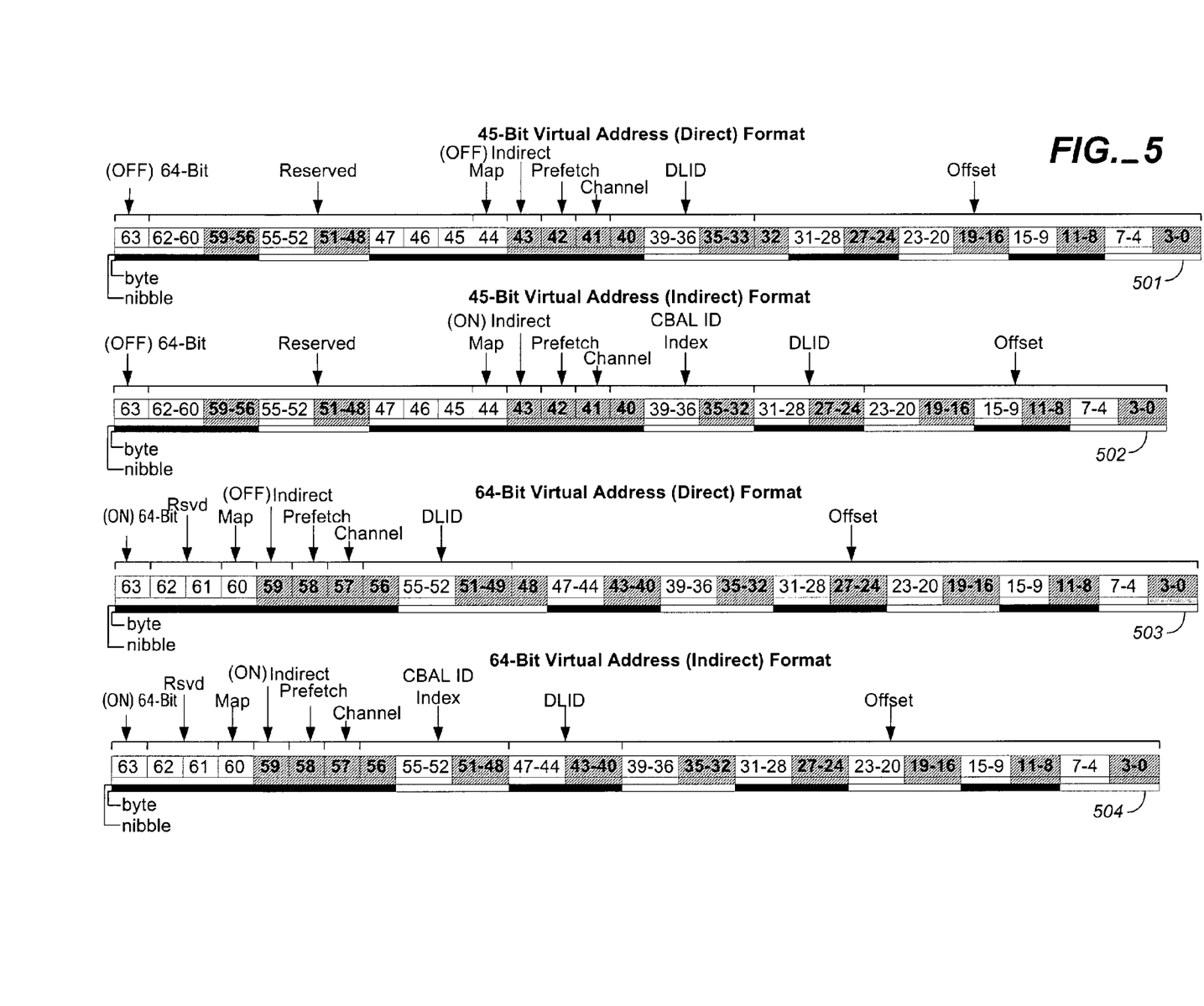
FIG. 5 is a data diagram illustrating exemplary preferred embodiments of various virtual address structures.

FIG. 5 shows four exemplary preferred embodiments of a specific virtual address. FIG. 5 illustrates 45-bit specific virtual addresses 501 and 502 (i.e., bits 0–44 used for addressing and bits 45–63 reserved for other purposes, such as control functions) and 64-bit specific virtual addresses 503 and 504. Addresses 501 and 503 illustrate addresses used for direct data transfers, whereas addresses 502 and 504 illustrate addresses used for indirect data transfers. Each of the addresses has similar fields. For example, bit 63 of an address is used to select the total number of address bits to be used. If bit 63 is set, or "on", fewer reserved bits will be used in the specific virtual address. Another field is the "Indirect Field" of the address. This Indirect Field of the address determines if the data transfer is direct or indirect. The Indirect Field is typically designated by the base virtual address sent to the I/O module, such as I/O module 202 of FIG. 2. Another field, the "DLID Field", identifies the storage element in which the I/O request will be routed. This DLID Field is useful in properly routing the data through various connection schemes, such as those mentioned in FIG. 1. Another field, the "CBAL ID Field", is used in the addresses 502 and 504 for determining indirect mapping into physical address locations of the storage elements, such as storage element 208 of FIG. 2. The CBAL ID Field includes a proper subset of a mapping structure, such as mapping structure 400 of FIG. 4, to access the physical addresses locations. Each address contains an "Offset Field", used to determine physical addresses of data within a storage element. The addresses also include other fields such as a "Map Field", a "Pre-fetch Field", and a "Channel Field". The Channel Field identifies a channel of a host interface, such as host interface 302 of FIG. 3, that should be used (e.g., when the host interface chip has two channels). The Pre-fetch Field notifies an N-chip, such as N-chip $202_{N\text{-}chip}$ of FIG. 3, whether data has been prefetched into memory, such as controller cache 402 of FIG. 4, for use such that the N-chip may locate the data in memory. The Map Field signifies whether the address is intended for either local memory or remote memory.

Once a storage controller, such as storage controller $212_{208A}$ of virtualized storage element 208 in FIG. 2, receives a specific virtual address, the storage controller processes the address to determine the physical location of data within a storage element. For example, a storage controller processes the Indirect Field of the address to determine if the data transfer requires mapping. If so, the storage controller processes the CBAL ID and Offset Fields to determine the physical storage location. The storage controller first processes the CBAL ID to determine a CBAL ID table address. The CBAL ID table address is located within a CBAL ID table, such as CBAL ID table 404. The CBAL ID table address points to a CBAL address located in a CBAL, such as CBAL 406. The storage controller then processes the CBAL address using the received specific virtual address to determine the address of physical storage within the storage element.

Figure 6:
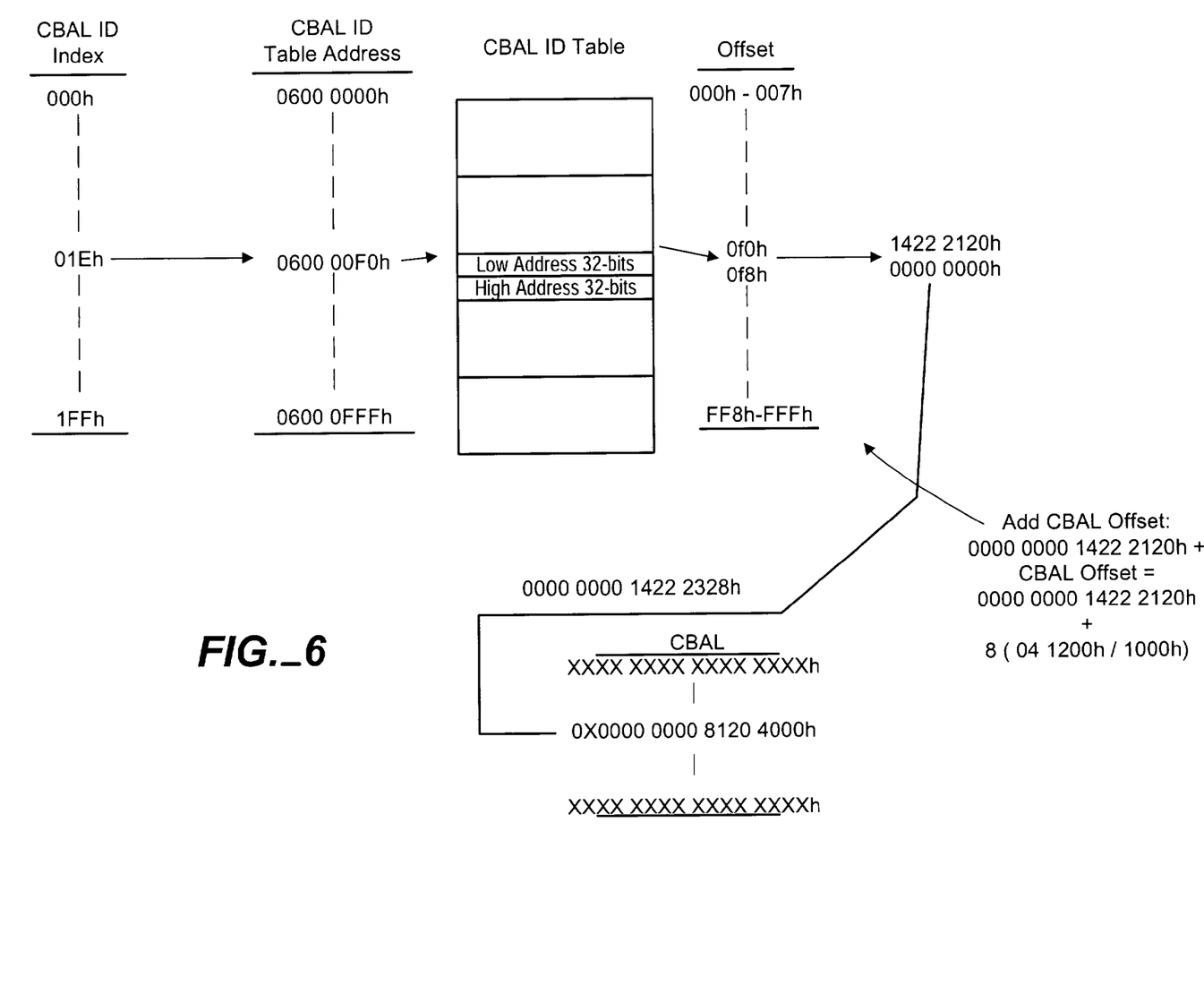
FIG. 6 is a diagram illustrating a mapping process used in conjunction with one of the virtual address structures of FIG. 5.

To better illustrate the above example, one embodiment of a specific virtual address being processed is shown in FIG. 6. In this example, the I/O module sends a 45-bit specific virtual address (e.g., addresses 502) of:

Specific Virtual Address=0000 1C1E 1104 1200 (Hexadecimal, or 'h').

The CBAL ID field contains a value of
CBAL ID=01 Eh.

The Indirect field has a bit enabling indirect data transfer (e.g., bit 43 is on). The Offset Field has a value of
Specific Virtual Address Offset=04 1200h.

From the I/O request, the block size (CCB size) of data being accessed is, for example, CCB size=1000h.

The CBAL ID indexes into a CBAL ID table address of, for example,

CBAL ID table address=0600 00F0h.

At that CBAL ID table address of 0600 00F0h, a 64-bit address is stored. The CBAL ID table 64-bit address is, for example, CBAL ID table 64-bit address=1422 2120 0000 0000h.

The storage controller processes the CBAL ID table 64-bit address to determine the actual physical address of the data within the storage element. The storage controller adds a CBAL address to the CBAL ID table 64-bit address. The storage controller determines the CBAL address by first determining a CBAL Offset. The storage controller determines the CBAL Offset by dividing the Offset Field of the specific virtual address by the block size and multiplying the resulting quotient by one byte, as follows:

$CBAL\ Offset=8\cdot(04\ 1200h)/(1000h)=208h,$ having a quotient of 41 h and a remainder of 200h. The storage controller then adds the CBAL Offset to the CBAL ID table 64-bit address, which equals $(0000\ 0000\ 1422\ 2120h)+(208h)=0000\ 0000\ 1422\ 2328h.$ The CBAL ID table 64-bit address maps, for example, to a CBAL address of CBAL address=0000 0000 8120 4000h.

The storage controller then determines the actual physical location of the data within the storage element by adding the remainder of CBAL Offset calculation, 200h, to the CBAL address, Physical Location of Data=0000 0000 8120 4000$h$+ 200$h$=0000 0000 8120 4200$h$.

Once the actual physical location of the data is determined, the data can be accessed by the host system in accordance with the I/O request. In one embodiment, the base virtual addresses have structures that are similar to the specific virtual addresses.

Figure 7:
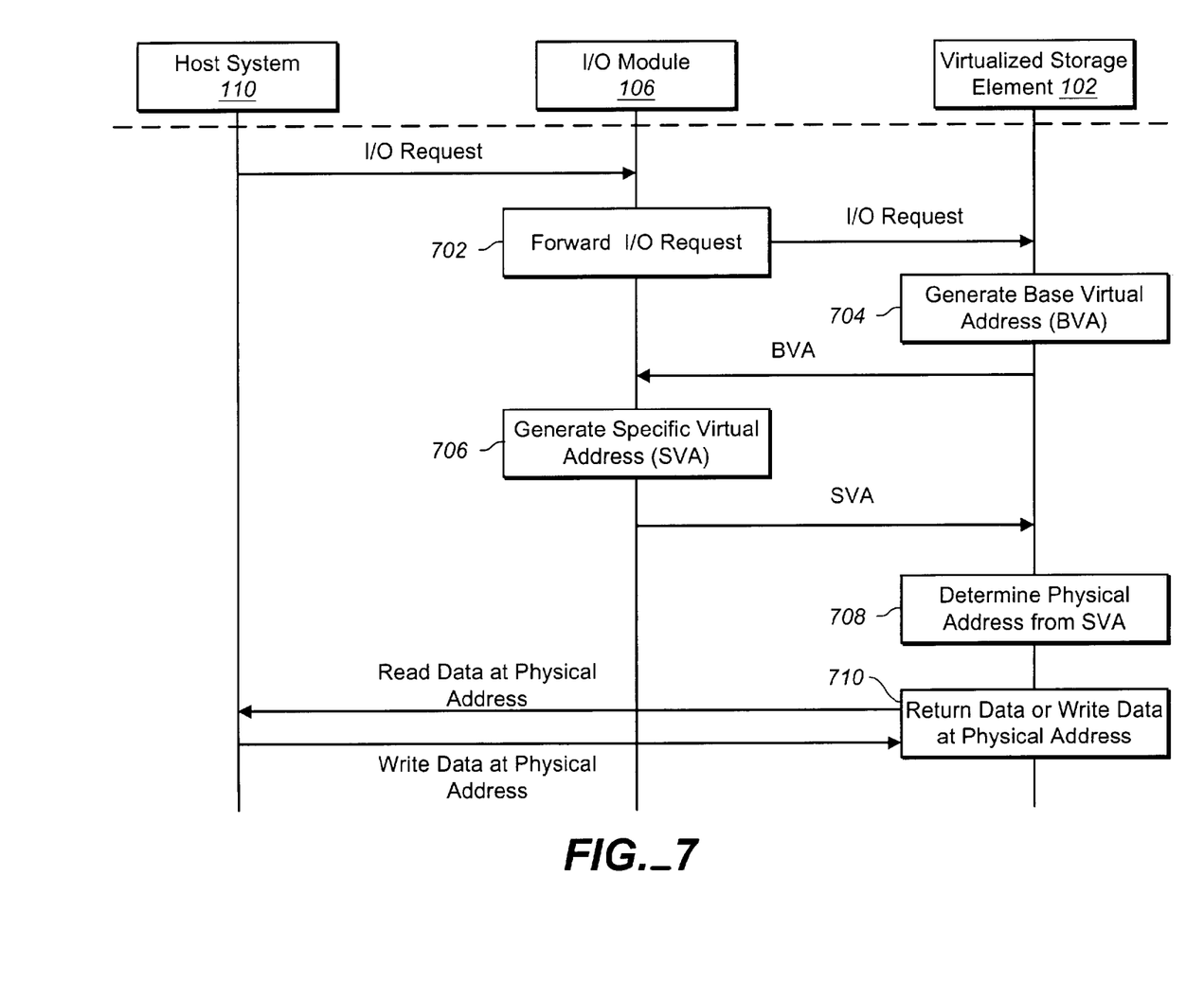
FIG. 7 is an operational diagram illustrating an exemplary preferred operation of FIG. 1.

FIG. 7 shows an operational diagram illustrating an exemplary preferred operation of FIG. 1. Host system 110 sends an I/O request to I/O module 106 for a block of storage space within virtualized storage element 102. I/O module 106 forwards the request to virtualized storage element 102, in step 702. Virtualized storage element 102 receives the I/O request and, from that request, a storage controller, such as storage controller 212$_{2084}$ of FIG. 2, generates a base virtual address, in step 704. Virtualized storage element 102 sends the base virtual address to I/O module 106. I/O module 106 receives the base virtual address and extracts offset information and data transfer information (e.g., information indicating a type of data transfer, such as direct or indirect). From the information obtained in the base virtual address and from information in the I/O request, I/O module 106 generates a specific virtual address, such as those shown in FIG. 5, in step 706. I/O module 106 then sends the specific virtual address to virtualized storage element 102. Once virtualized storage element 102 receives the specific virtual address, the storage controller determines the physical location of the data in the storage element, in step 708. If the specific virtual address indicates that the method of data transfer is direct, the data is directly accessed by information in the specific virtual address. If the specific virtual address indicates that the method of data transfer is indirect, the data may be accessed according to the indirect mapping described in FIG. 6. Once the physical location of the data is determined, the storage controller transfers the data between virtualized storage element 102 and host system 110, depending on the type of I/O request, in step 710. For example, if the I/O request is a read request, the storage controller transfers the data from physical storage location of virtualized storage element 102 to host system 110. If the I/O request is a write request, the storage controller transfers data from host system 110 to the physical storage location of virtualized storage element 102. This exemplary operation shows one host system, one I/O module, and one virtualized storage element. However, this operation is not intended to limit the embodiments to single host systems, I/O modules, and storage elements. For example, multiple host systems, I/O modules, and virtualized storage elements such as those shown in FIGS. 1 and 2 can and typically operate in accordance with the operation described herein.

Figure 8:
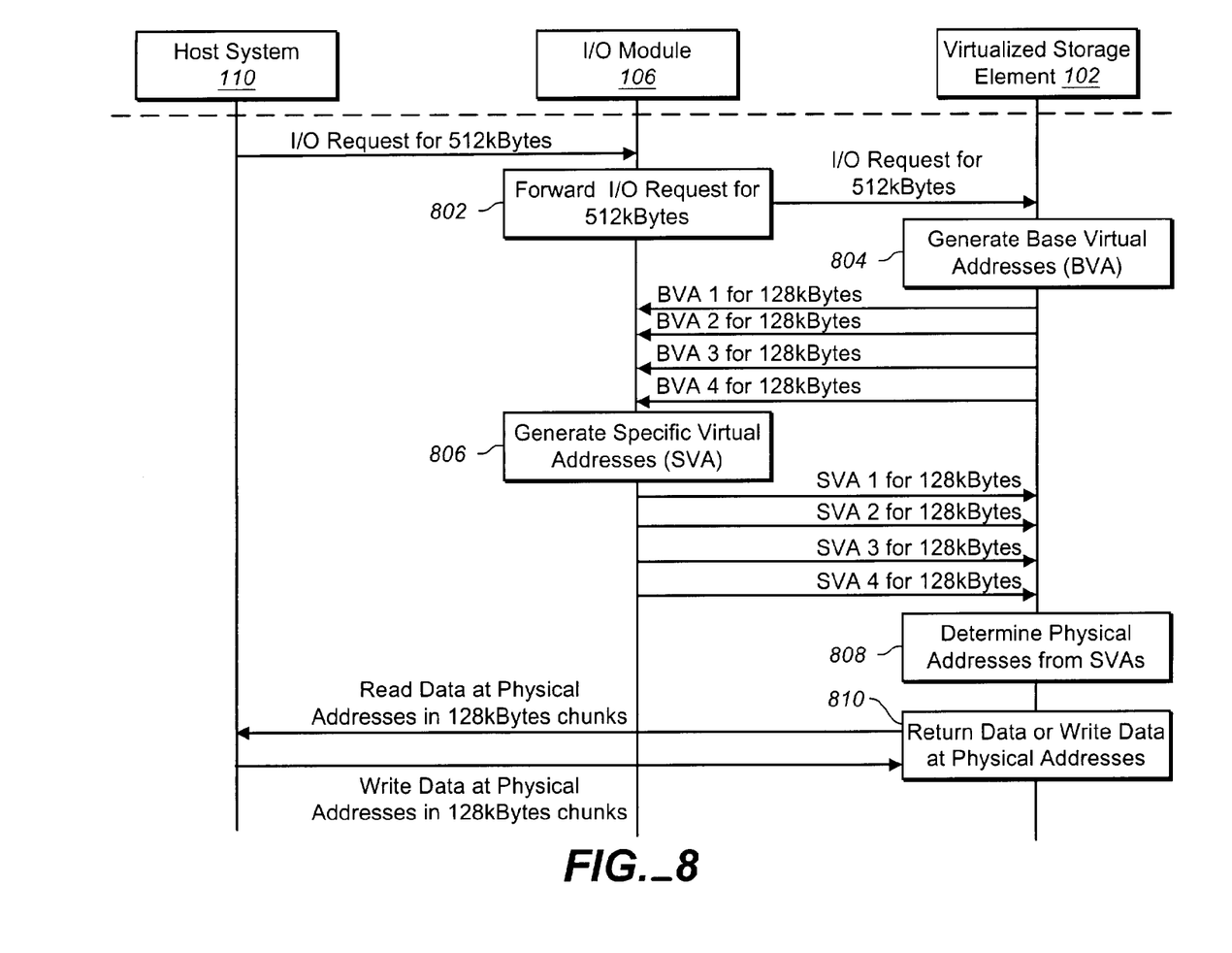
FIG. 8 is an operational diagram illustrating another exemplary preferred operation of FIG. 1.

FIG. 8 shows an operational diagram illustrating another exemplary preferred operation of FIG. 1. Host system 110 sends an I/O request to I/O module 106 for a 512 kBytes block of storage space within virtualized storage element 102. I/O module 106 forwards the request to virtualized storage element 102, in step 802. Virtualized storage element 102 receives the I/O request and, from that request, a storage controller, such as storage controller 212$_{2084}$ of FIG. 2, generates base virtual addresses, in step 804. However, in this embodiment, the storage controller may have only 128 kBytes of cache available. Therefore, the storage controller generates four base virtual addresses that allow access to 128 kBytes sections of the physical storage space to accommodate the 512 kBytes I/O request. Virtualized storage element 102 sends the base virtual addresses to I/O module 106. I/O module 106 receives the base virtual addresses and extracts offset information and data transfer information (e.g., information indicating a type of data transfer, such as direct or indirect). From the information obtained in each of the base virtual addresses and from information in the I/O request, I/O module 106 generates specific virtual addresses, such as those shown in FIG. 5, in step 806. I/O module 106 then sends the specific virtual addresses to virtualized storage element 102. Once virtualized storage element 102 receives the specific virtual addresses, the storage controller determines the physical location of the data in the storage element, in step 808. If the specific virtual addresses indicate that the method of data transfer is direct, the data is directly accessed in 128 kBytes chunks according to the information of each specific virtual address. If the specific virtual addresses indicate that the method of data transfer is indirect, the data may be accessed in 128 kBytes chunks according to the indirect mapping described in FIG. 6. Once the physical location of the data is determined, the storage controller transfers each of the 128 kBytes chunks of data between virtualized storage element 102 and host system 110, depending on the type of I/O request, in step 810. For example, if the I/O request is a read request, the storage controller transfers the data from physical storage location of virtualized storage element 102 to host system 110. If the I/O request is a write request, the storage controller transfers data from host system 110 to the physical storage location of virtualized storage element 102.

Instructions that perform the operations of FIGS. 6, 7, and 8 can be stored on storage media. The instructions can be retrieved and executed by a microprocessor. Some examples of instructions are software, program code, and firmware. Some examples of storage media are memory devices, tapes, disks, integrated circuits, and servers. The instructions are operational when executed by the microprocessor to direct the microprocessor to operate in accord with the invention. Those skilled in the art are familiar with instructions and storage media.

While the preceding examples illustrate virtual addressing and processing requests from a host system, the examples are not intended to be limiting. Those skilled in the art understand that other combinations of addressing will fall within the scope of the invention. Those skilled in the art will also understand that other methods can be used to transfer requests that fall within the scope of the invention.

Advantages of the invention include a reduction of memory bandwidth, as large computationally intensive maps are no longer transferred from the storage element. Other advantages include improved request management and faster data transfers between storage elements and host systems.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A system, comprising:
    an I/O module for processing I/O requests from a separate and distinct host system;
    a virtualized storage element separate and distinct from the host system including:
        a plurality of physical storage locations; and
        a mapping table for translating virtual storage locations into the physical storage locations; and
    a communication medium coupling the I/O module to the virtualized storage elements,
    wherein the virtualized storage element is operable to generate base virtual addresses using the mapping table to communicate the base virtual addresses to the I/O module,
    wherein the I/O module is operable to generate specific virtual addresses using the base virtual addresses and using information derived from the I/O requests, and
    wherein the I/O module uses the specific virtual addresses in communication with the virtualized storage element to identify the physical storage locations in the virtualized storage element.

2. The system of claim 1, wherein the communication medium includes a storage communication switching fabric for transferring the I/O requests between the host system and the physical storage locations using the specific virtual addresses.

3. The system of claim 1, wherein the I/O module is operably configured within the host system.

4. The system of claim 1, wherein the I/O module is operably configured within the virtualized storage element.

5. The system of claim 1, wherein the base virtual addresses includes a proper subset of the mapping tables for indirect access to the physical storage locations.

6. The system of claim 1, wherein the base virtual addresses include indicators to alert the I/O module to a type of addressing, wherein the addressing is direct or indirect.

7. A method, operable in a storage system, for handling I/O requests from a separate and distinct host system to the storage system, the storage system having an I/O module and having a virtualized storage element, the method including steps of:
    receiving an I/O request in the I/O module;
    forwarding the received I/O request from the I/O module to the virtualized storage element;
    translating, within the virtualized storage element, virtual storage locations specified in the received I/O request using a mapping table to generate base virtual addresses;
    returning the base virtual addresses to the I/O module;
    generating, within the I/O module, specific virtual addresses from the base virtual addresses and from information derived from the I/O requests; and
    processing the I/O requests from the host system by forwarding a request from the I/O module to the virtualized storage element using the specific virtual addresses in the forwarded request to identify the physical storage locations.

8. The method of claim 7, further including a step of transferring the I/O requests between the host system and the physical storage locations using the specific virtual addresses.

9. The method of claim 7, wherein the step of generating the specific virtual addresses includes a step of determining offsets from the base virtual addresses.

10. The method of claim 7, wherein the step of processing includes a step of determining the physical storage locations by processing offsets of the specific virtual addresses.

11. The method of claim 10, wherein the step of determining includes steps of:
    dividing each of a portion of the offsets by a size of storage space to be accessed to locate a map address, wherein the step of dividing produces a quotient and a remainder; and
    adding the remainder to the map address to determine a certain physical storage location.

12. A storage system for handling I/O requests from a separate and distinct host system to the storage system having an I/O module and having a virtualized storage element, the system including:
    means for receiving an I/O request in the I/O module;
    means for forwarding the received I/O request from the I/O module to the virtualized storage element;
    means, within the virtualized storage element, for translating virtual storage locations specified in the received I/O request using a mapping table to generate base virtual addresses;
    means for returning the base virtual addresses to the I/O module;
    means, within the I/O module, for generating specific virtual addresses from the base virtual addresses and from information derived from the I/O requests; and
    means for processing the I/O requests from the host system by forwarding a request from the I/O module to the virtualized storage element using the specific virtual addresses in the forwarded request to identify the physical storage locations.

13. The system of claim 12, further including means for transferring the I/O requests between the host system and the physical storage locations using the specific virtual addresses.

14. The system of claim 12, wherein the means for generating the specific virtual addresses includes means for determining offsets from the base virtual addresses.

15. The system of claim 12, wherein the means for processing includes means for determining the physical storage locations by processing offsets of the specific virtual addresses.

16. The system of claim 15, wherein the means for determining includes:

means for dividing each of a portion of the offsets by a size of storage space to be accessed to locate a map address, wherein the step of dividing produces a quotient and a remainder; and means for adding the remainder to the map address to determine a certain physical storage location.

17. The system of claim 12, wherein the base virtual addresses includes a proper subset of the mapping tables for indirect mapping.

18. The system of claim 12, wherein each of the base virtual addresses includes an interface identifier field used to indicate an interface type that transfers the I/O requests.

* * * * *